(No Model.)
D. M. SCHELL.
THILL TUG.
No. 446,694. Patented Feb. 17, 1891.
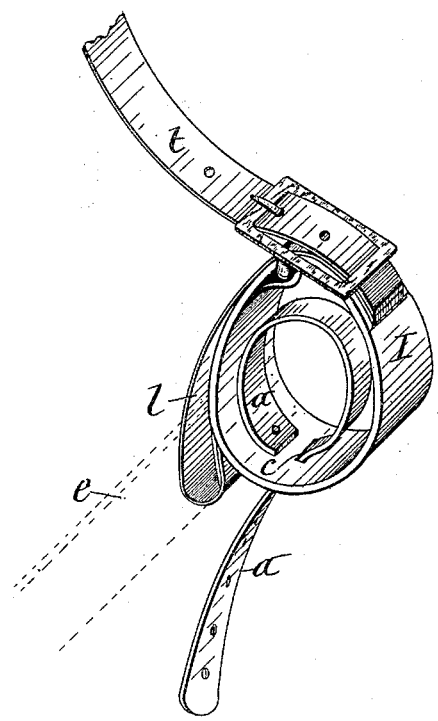
WITNESSES:
J. J. Laasg.
C. L. Bendixon
INVENTOR:
Duncan M. Schell
By Huell, Laass & Duell
his ATTORNEYS.
THE NORRIS PETERS CO., PHOTO-LITHO., WASHINGTON, D. C.

UNITED STATES PATENT OFFICE.

DUNCAN M. SCHELL, OF CASTLETON, VERMONT.

THILL-TUG.

SPECIFICATION forming part of Letters Patent No. 446,694, dated February 17, 1891.

Application filed September 15, 1890. Serial No. 364,996. (No model.)

*To all whom it may concern:*

Be it known that I, DUNCAN M. SCHELL, of Castleton, in the county of Rutland, in the State of Vermont, have invented new and useful Improvements in Safety Shaft-Holders, of which the following, taken in connection with the accompanying drawing, is a full, clear, and exact description.

This invention relates to devices applied to thill-tugs of harnesses for the purpose of obtaining a more secure hold on the thills.

The object of the invention is to provide a thill-tug which shall be complete in itself and capable of supporting the thill, and shall have secured to it a safety-strap which shall firmly embrace the thill within the tug; and the object of the invention is to also provide means for supporting the thill in case the back-pad strap breaks or draws out from under the saddle; and to that end the invention consists in the improved construction and combination of parts hereinafter described, and specifically set forth in the claims.

The annexed drawing represents a perspective view of a thill-tug embodying my invention.

I denotes the thill-tug, which is a complete loop and of the usual form, completely surrounding the thill and connected to the back-pad strap $t$ in the usual manner. This tug I provide with a transverse slot $c$, through its bottom portion, and at one side of said slot I attach to the interior of said bottom portion of the tug one end of the safety-strap $a$, the opposite end of which passes through the slot $c$ and to the buckle of the girth of the harness, to which buckle said strap is connected when the horse is hitched to the vehicle.

In hitching the horse the portion of the safety-strap $a$ which is inside of the thill-tug I is formed into a loop to receive the thill endwise through it. Then by passing the free end of the said safety-strap through the buckle of the girth and drawing the strap tight and then fastening it to the said buckle, the safety-strap is caused to embrace the thill with such tight grasp as to allow it to draw the vehicle independent of the trace, and also hold back the vehicle independent of the usual holdback-straps, and thus all danger incident to the breaking or accidental unhitching of the trace and holdback-strap is obviated.

$l$ represents a supplemental loop, which is carried on the side of the thill-tug I nearest the horse, and may be either sewed or otherwise attached directly to the thill-tug or connected to the buckle, to which the back-pad strap $t$ is connected, as shown. This supplemental loop $l$ receives through it the trace $e$ of the harness, as indicated by dotted lines in the annexed drawing, and thereby prevents the trace from flopping up and down when the horse is in motion; but its most important function is that of a supplemental safety-strap, which, by means of the trace attached to the breast-collar and whiffletree, supports the shafts and prevents the same from falling to the ground in case the back-pad strap breaks or draws out from under the saddle. Said supplemental loop is especially desirable on harnesses designed to be used with carts, inasmuch as it prevents the thills from flying up farther than the length of the loop in case of the aforesaid accident to the back-pad strap.

Having described my invention, what I claim as new, and desire to secure by Letters Patent, is—

1. The combination of the thill-tug I, consisting of a complete loop and having the slot $c$ transversely through its bottom portion, and the strap $a$, secured at one end to the bottom portion of the interior of the said thill-tug and passing with its free end through the slot $c$ and adapted to be connected to the girth of the harness, substantially as and for the purpose set forth.

2. The combination of the thill-tug provided with the slot $c$, the strap $a$, secured at one end to the interior of said thill-tug and passing with its free end through the slot $c$ and adapted to be connected to the girth of the harness, and the safety-loop $l$, attached to the thill-tug at its side adjacent to the horse, substantially as and for the purpose specified.

In testimony whereof I have hereunto signed my name this 3d day of September, 1890.

DUNCAN M. SCHELL. [L. S.]

Witnesses:
C. W. GREEN,
J. E. MANLEY.